United States Patent [19]

Williams

[11] 3,749,335
[45] July 31, 1973

[54] AUTOPILOT SYSTEM CONTROLLING ENTRY OF A CRAFT INTO FORBIDDEN ZONES

[76] Inventor: Thurston V. Williams, c/o The O. K. Tool Co., Inc., Milford, N.H. 03055

[22] Filed: Oct. 23, 1970

[21] Appl. No.: 83,271

[52] U.S. Cl...... 244/77 B, 235/150.22, 235/150.27, 244/77 D, 318/584
[51] Int. Cl........................................... B64c 13/18
[58] Field of Search............. 244/77 B, 77 V, 77 D, 244/155, 5 A, 3.14, 3.19; 73/178 R T; 235/150.2, 150.22, 150.26, 150.27; 318/581, 583, 584; 343/107, 108 R, 112 R, 112 A, 112 CA

[56] References Cited
UNITED STATES PATENTS 3,088,697   5/1963   Cutler.............................. 244/15 A
3,414,214   12/1968  Robinson et al.................. 244/15 A
3,434,141   3/1969   Welti......................... 343/112 CA X
3,623,090   11/1971  Gilbert et al............. 343/112 CA X
3,644,722   2/1972   Hobbs et al.................. 244/77 D X
2,952,405   9/1960   Guarino.......................... 244/77 B
3,015,458   1/1962   Marx................................ 255/77 D
2,985,410   5/1961   Richter et al..................... 244/77 V
2,953,329   9/1960   Ciscel.............................. 244/77 V
2,322,225   6/1943   Crane et al....................... 244/77 B Primary Examiner—Milton Buchler
Assistant Examiner—Stephen G. Kunin
Attorney—James H. Grover

[57] ABSTRACT

In combination with the autopilot system of an aircraft an onboard control system inaccessible to the pilot responds to ground transmitted or onboard computed geographical position signals to restrict pilot heading or descent maneuvers when the aircraft enters a forbidden geographical zone.

2 Claims, 3 Drawing Figures

INVENTOR
THURSTON V. WILLIAMS
BY Roberts, Cushman & Grover
ATTYS

AUTOPILOT SYSTEM CONTROLLING ENTRY OF A CRAFT INTO FORBIDDEN ZONES

Existing autopilot systems permit the pilot of various craft and vehicles manually to set the heading, and in aircraft the roll and pitch of the craft, and temporarily to turn over such preset maneuvers to the control of onboard automatic systems. The pilot also has available onboard an automatic altimeter, air speed meter and a computer for calculating and registering for display the geographical position of the craft with respect to its departure point. It is also possible with loran or other radio navigation beacons to supply position information to the craft from the ground.

It is the object of this invention to use such existing onboard equipment in a system, inaccessible to and therefore beyond the control of the pilot, for restricting, to a degree compatible with the safety of the craft, the entry or descent of the craft into an undesirable or prohibited geographical zone.

According to one form of the invention a craft control system comprises means for maneuvering the craft, pilot-inaccessible means for registering the entry of the craft into a predetermined geographical zone, and pilot-inaccessible means responsive to the position register to prevent a selected maneuver of the craft in the predetermined geographical zone. The prevented maneuver may be a turn toward a prohibited zone, continuance on a course into such a zone, or, in the case of aircraft, descent below a predetermined altitude.

Further according to the invention an aircraft control system comprises means for adjusting the climb, descent and heading of the aircraft, means for sensing descent of the aircraft below a predetermined altitude, means to register a geographical position of the aircraft and produce a control signal when a predetermined position is registered, and means responsive to the altitude sensing means and position registering means to prevent the aircraft adjusting means from causing descent of the aircraft below the predetermined altitude.

In the accompanying drawing

Figure 1:
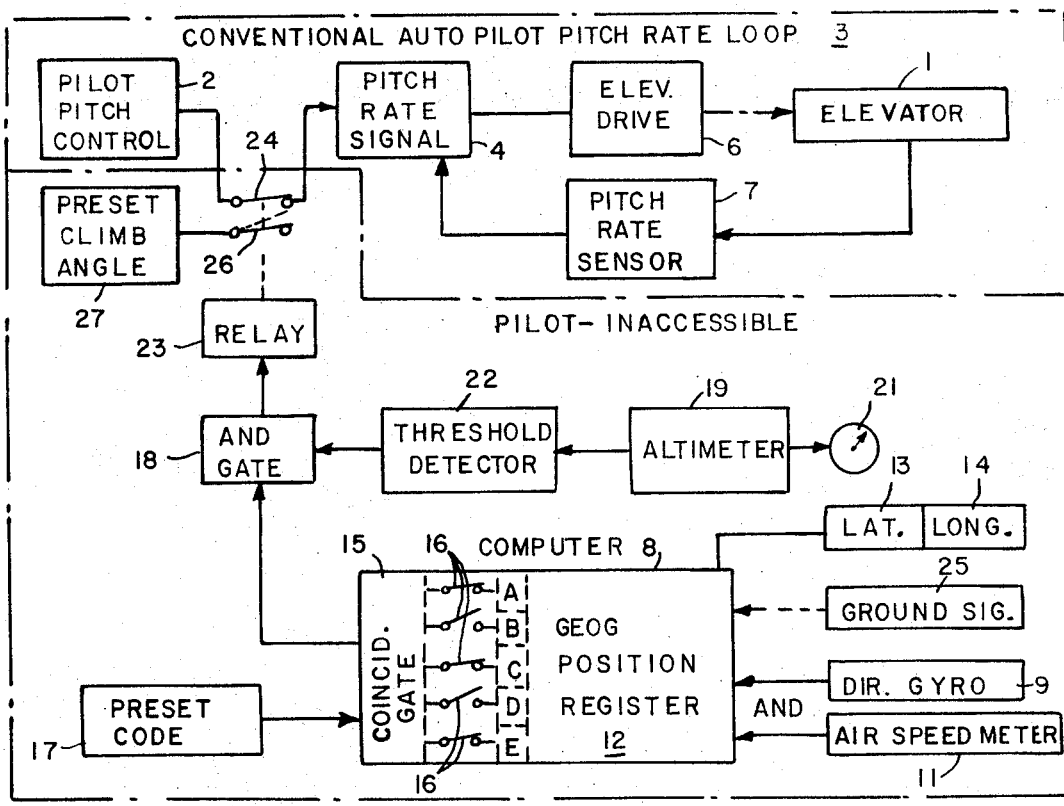
FIG. 1 shows an electronic elevator control system.

As shown in FIG. 1 the elevator 1 of an aircraft is normally adjusted by a pilot control 2 to set the pitch of the aircraft for climb or descent. In a conventional pitch rate electro-mechanical loop 3 the pilot's manual setting is transmitted electrically to a pitch rate signal generator 4 which energizes the drive 6 for the elevator. A sensor 7 of the elevator pitch transmits the actual elevator pitch in a loop back to the generator 4 for comparison and correction of the pitch rate to the pilot's setting. The aircraft will assume and continue on the angle of climb or descent until the pilot changes the pitch setting.

Conventional onboard aircraft equipment also includes a computer 8 receiving electrical heading signals from a free directional gyro 9 and velocity signals from an air speed meter 11. From these signals the geographical position is continuously calculated by the computer and the instantaneous latitude and longitude is coded for temporary storage in the memory elements, for example A,B,C,D,E of the computer's register 12. The registered position code is presented on latitude and longitude displays 13 and 14. In FIG. 1 a preselected combination of register elements A,C and D are connected to coincidence gate 15 or equivalent logic device which produces a control signal when any one of a number of geographical positions are registered by latitude and longitude in the computer. It will be understood that while five register elements, A to E, are shown as a simplified example, a much larger number will actually be used to enable registering in code various positions. Any group of coded positions may be selected which represent a geographical zone tens or hundreds of miles in area. The memory elements, or combination thereof, representing all positions in the zone may be connected by switches or gate elements 16 to the coincidence gate 15. It is intended that the switching connections be established while the aircraft is on the ground, for example by means of inserting a punched card in a card reader 17. Prior to take-off the computer is rendered inaccessible to the air crew by locking or by reason of its location on the aircraft. During flight if aircraft enters the preselected zone the computer will register a position in the zone in a combination of register elements connected to the coincidence gate 15, causing the gate to pass a control signal to an AND gate 18. Register of positions outside the zone will not coincide with the preselected connection through switches 16 and will not affect the coincidence gate 15.

To pass the control signal from the computer the AND gate 18 must also receive a preselected altidude signal. Conventional onboard altimeter 19 continuously measures the aircraft's altitude in flight for normal presentation on a display 21. The measurement by the altimeter 19 is also sensed by a threshold detector 22 which produces a secondary control signal when the aircraft descends below a preselected height, say 5000 feet, set in the threshold detector prior to take-off and inaccessible to the pilot thereafter.

When the computer registers a position in the preselected geographical zone, and the altimeter registers a position below the preselected altitude, the AND gate 18 will pass the control signal to switching means such as a relay 23, transferring contacts 24 and 26 from the position shown in FIG. 1. The pilot operated pitch control 2 is disconnected by contact 24 from the pitch rate loop 3, at least to the extent of controlling descent pitch, and a substitute preset pitch signal source 27 is connected to the pitch rate loop by contact 26. The preset signal source 27 preferably corresponds to a slow climb signal from the pilot control and, beyond the control of the pilot, causes the aircraft to climb until it is above the preselected altitude. The aircraft is thus prevented from descending for a landing under pilot pitch control while in the preselected zone. When the altimeter 19 measures an altitude above the height preselected by the threshold detector 22, the secondary control signal is removed from the AND gate 18 and the relay 23 reconnects the pilot pitch control 2 through contact 24 to the pitch rate loop 3.

It is also possible to supply the geographical position information to the computer 8 through an onboard receiver of ground signals 25 as shown by the broken line arrow. The ground signal receiver is inaccessible to the air crew as are all components of the system of FIG. 1 located in the lower broken line portion of FIG. 1.

Figure 2:
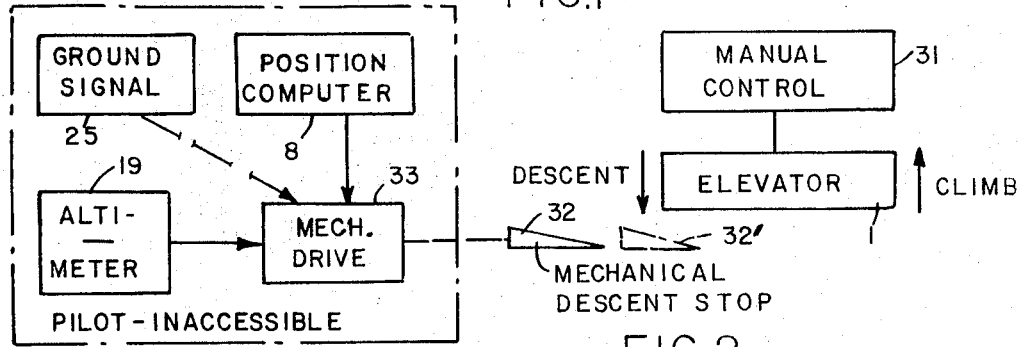
FIG. 2 shows schematically a mechanical aircraft elevator control system.

In FIG. 2 an alternative pitch rate control is shown in a pilot system having a manual control 31 for the aircraft elevator 1. A mechanical stop 32 is movable by a mechanical drive 33 to a position 32' in which it can adjust the elevator 1 from a descent pitch position, if it is in descent pitch, and hold the elevator 1 in a slight climb pitch, overriding the manual or other elevator control 31. The mechanical drive 33 performs the function of the AND gate 18 and the threshold detector 22 in responding to signals from the position computer 8 and altimeter 19 of, or alternatively to the ground signal receiver 25, of FIG. 1, and prevents descent of the aircraft below a predetermined altitude while in a preselected zone.

Either of the above systems allow unlimited pilot control outside the preselected geographical zone and inside the zone above the preselected altitude. In the zone and below the preselected altitude the pilot is allowed all maneuvers except pitching for descent below that altitude.

Figure 3:
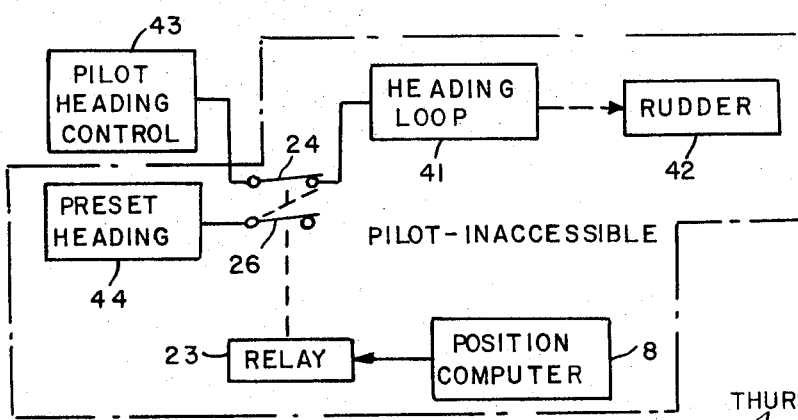
FIG. 3 shows an electronic heading control system.

As an alternative or in combination with the pitch control systems described above a heading control system is shown in FIG. 3. A conventional autopilot heading loop 41 for controlling a rudder 42 of air or surface craft is substantially the same as the described pitch rate loop, and normally receives heading signals from a pilot heading control 43, the only component of the system accessible to the pilot, or, of course, to the crew or passengers. Arrival, approach or other maneuver of the craft into a preselected geographical zone is registered in the position computer 8 as in FIG. 1, causing the relay 23 to transfer its contacts 24 and 26. Contact 24 then disconnects the pilot heading control 43 and connects a ground preset heading signal source 44 to the heading loop 41. The heading signal source 44 may be preset for a specific heading or for a specific heading change, for example a 180° turn which will adjust the rudder 42 to head the craft out of the preselected zone. The aircraft is thus prevented from entering the selected zone to any substantial degree. Since both heading and pitch control systems are available on aircraft, both may be connected with the same onboard computer in the way shown in FIGS. 1 and 3.

It should be understood that the present disclosure is for the purpose of illustration only and that this invention includes all modifications and equivalents which fall within the scope of the appended claims. I claim:

1. A pilotted aircraft control system comprising:
   means for maneuvering the craft,
   means beyond the control of the pilot to register continuously the entry of the craft into and continued presence in a predetermined geographical zone, and
   means beyond the control of the pilot responsive to said register and controlling said maneuvering means to prevent a selected maneuver of the craft in said geographical zone, the register means being operative to control the maneuvering means so long as presence in the zone is registered,
   wherein said maneuvering means comprises an elevator or like aircraft pitch element, characterized by altitude sensing means connected to said responsive means to cause said responsive means to control the pitch element so as to prevent descent of the aircraft below a predetermined altitude in said geographical zone.

2. A pilotted aircraft control system comprising
   means for adjusting climb and descent of the aircraft,
   means for sensing descent of the aircraft below a predetermined altitute,
   means beyond the control of the pilot to register the geographical position of the aircraft and continuously produce a control signal when a predetermined position is registered, and
   means beyond pilot control responsive to the sensing means and register means and controlling the climb and descent adjusting means only to prevent said adjusting means from causing descent of the aircraft below said predetermined altitude when the aircraft is in said geographical position.

* * * * *